United States Patent

Wu (12)

(10) Patent No.: US 6,506,026 B2
(45) Date of Patent: Jan. 14, 2003

(54) HAND PUMP WITH AND ATTACHING DEVICE FOR ATTACHMENT TO A BICYCLE FRAME

(76) Inventor: Scott Wu, No. 6, Lane 176, Wu Fu Road, Wu Feng Hsiang, Taichung Hsien (TW)

(*) Notice: Subject to any disclaimer, the term of this patent is extended or adjusted under 35 U.S.C. 154(b) by 0 days.

(21) Appl. No.: 09/877,361

(22) Filed: Jun. 8, 2001

(65) Prior Publication Data

US 2002/0187053 A1 Dec. 12, 2002

(51) Int. Cl.[7] ............................................... F04B 53/00
(52) U.S. Cl. ........................ 417/234; 417/572; 92/58.1
(58) Field of Search ................................ 417/234, 572, 417/555.1, 521, 528, 530, 446, 467, 468, 469

(56) References Cited

U.S. PATENT DOCUMENTS

| 4,120,614 A | * | 10/1978 | Bouder | ......................... 417/63 |
| 4,569,275 A | * | 2/1986 | Brunet | ......................... 92/58.1 |
| 4,803,857 A | * | 2/1989 | Hall et al. | ...................... 70/58 |
| 5,347,913 A | * | 9/1994 | Stepner | ........................ 92/58.1 |
| 5,494,411 A | * | 2/1996 | Chuang | ......................... 417/234 |

FOREIGN PATENT DOCUMENTS

JP                56000577 A    *    1/1981

* cited by examiner

Primary Examiner—Charles G. Freay
Assistant Examiner—Han L. Liu
(74) Attorney, Agent, or Firm—Alan D. Kamrath; Rider, Bennett, Egan & Arundel (57) ABSTRACT

A hand pump includes a cylinder defining a chamber therein. A reciprocating member has a first end slidably received in the chamber of the cylinder and a second end extended beyond the first end of the cylinder. A head is mounted to the second end of the cylinder and includes an engaging portion for engaging with a valve of an object to be inflated. A handle is attached to the second end of the reciprocating member rod and includes a first arcuate recess for engaging with a seat tube of a bicycle. An attaching member is mounted to the head and includes a second arcuate recess for engaging with a head tube of the bicycle. The attaching member and the head are movable relative to each other along a longitudinal direction of the cylinder.

20 Claims, 10 Drawing Sheets

HAND PUMP WITH AND ATTACHING DEVICE FOR ATTACHMENT TO A BICYCLE FRAME

BACKGROUND OF THE INVENTION

1. Field of the Invention

The present invention relates to a hand pump comprising an attaching device so as to be easily, quickly, and securely attached to a bicycle frame.

2. Description of the Related Art

A cyclist usually carries a hand pump on a bicycle frame for convenient inflation. Hand pumps generally include three sizes: large, medium, and small. Large-size hand pumps are bulky in size and weight and thus cannot be carried by the bicycle frame. Medium-size and small size hand pumps are more popular, yet they are more or less limited in inflation operation; namely, the smaller the hand pump size is, the longer the inflation time takes. Thus, the medium-size hand pumps are the cyclists' favorite. Yet, in practice, it is still not easy to securely attach a medium-size hand pump to a bicycle frame without the risk of falling off and the resultant damage to the hand pump.

SUMMARY OF THE INVENTION

It is the primary object of the present invention to provide a hand pump comprising an attaching device so as to be easily, quickly, and securely attached to a bicycle frame.

It is another object of the present invention to provide a hand pump that can be releasably attached to a bicycle frame, wherein a head of the hand pump for engaging with an object to be inflated is not exposed to the atmosphere when the hand pump is attached to the bicycle frame, thereby avoiding entrance of dust or other contaminants.

It is another object of the present invention to provide a hand pump that can be releasably attached to a bicycle frame, wherein a head of the hand pump for engaging with an object to be inflated is not exposed to the atmosphere when the hand pump is attached to the bicycle frame, thereby avoiding entrance of dust or other contaminants.

A hand pump in accordance with the present invention comprises:

- a cylinder defining a chamber therein and including a first end and a second end;
- a reciprocating member having a first end slidably received in the chamber of the cylinder and a second end extended beyond the first end of the cylinder;
- a head mounted to the second end of the cylinder and including an engaging portion adapted to engage with a valve of an object to be inflated;
- a handle attached to the second end of the reciprocating member rod and including a first arcuate recess for engaging with a seat tube of a bicycle; and
- an attachment member mounted to the head and including a second arcuate recess for engaging with a head tube of the bicycle;
- the attachment member and the head being movable relative to each other along a longitudinal direction of the cylinder.

The attachment member may further comprise an arcuate recess for engaging with a top tube of the bicycle and the handle may further comprise a fourth arcuate recess for engaging with the top tube of the bicycle.

In an embodiment of the invention, the attachment member is a tube comprising a compartment for receiving the head. A retainer is mounted in an outer end of the compartment. An elastic element is attached between the head and an end face of the retainer. The tube further comprises an opening. An inner periphery defining the compartment of the tube comprises a longitudinal groove that extends along a direction parallel to the longitudinal direction of the cylinder and a transverse groove that extends in a direction transverse to the longitudinal groove and that is communicated with an end of the longitudinal groove. The transverse groove is communicated with the atmosphere via the opening of the tube. The head comprises a block that is slidably received in the longitudinal groove and the transverse groove. The head is not exposed to the atmosphere when the hand pump is attached between the seat tube and the head tube of the bicycle. The head is movable into the transverse groove and thus positioned in place with the engaging portion of the head communicating with the atmosphere via the opening when the hand pump is removed from the bicycle for inflation.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
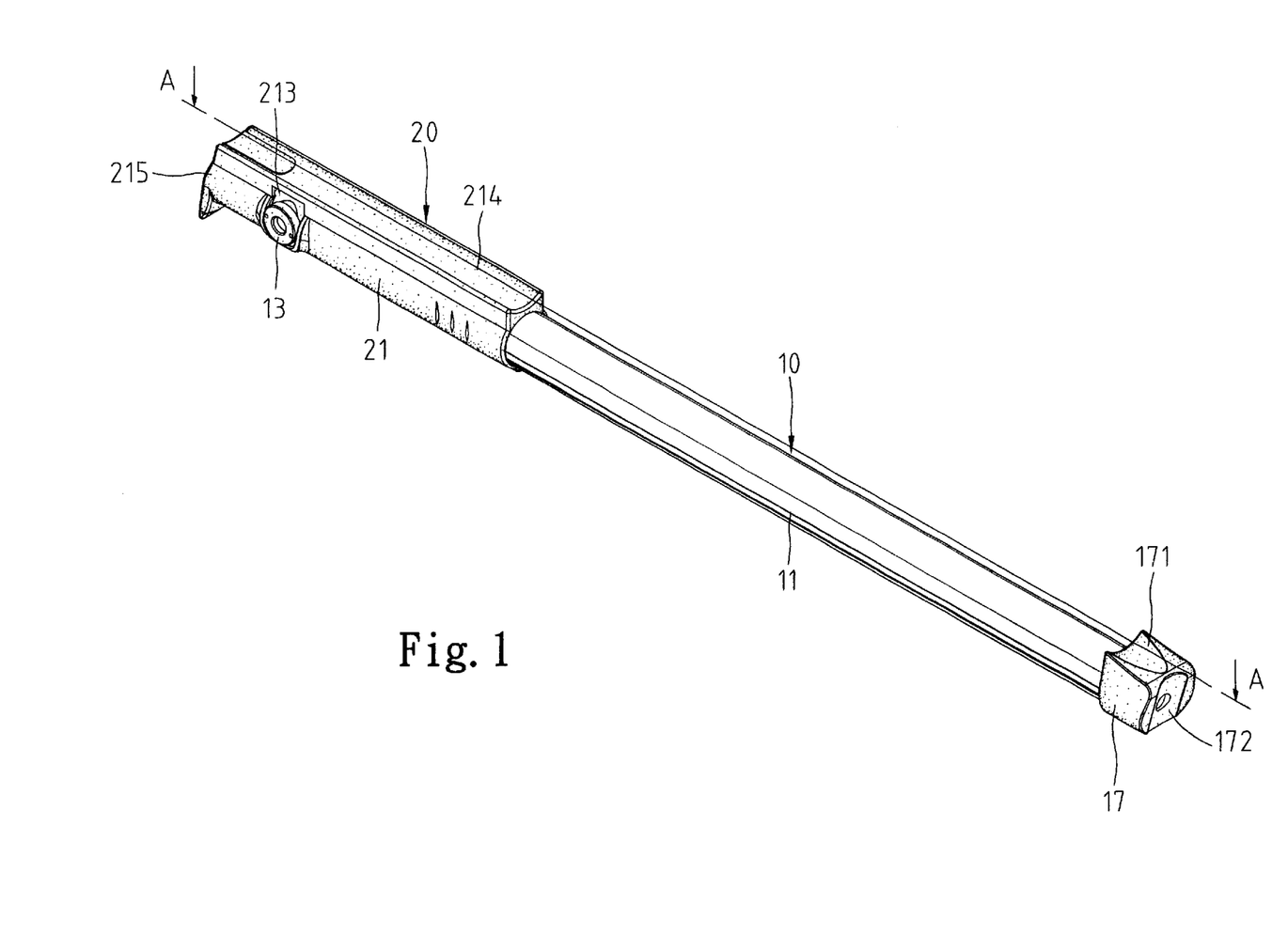
FIG. 1 is a perspective view of a hand pump in accordance with the present invention.
Figure 2:
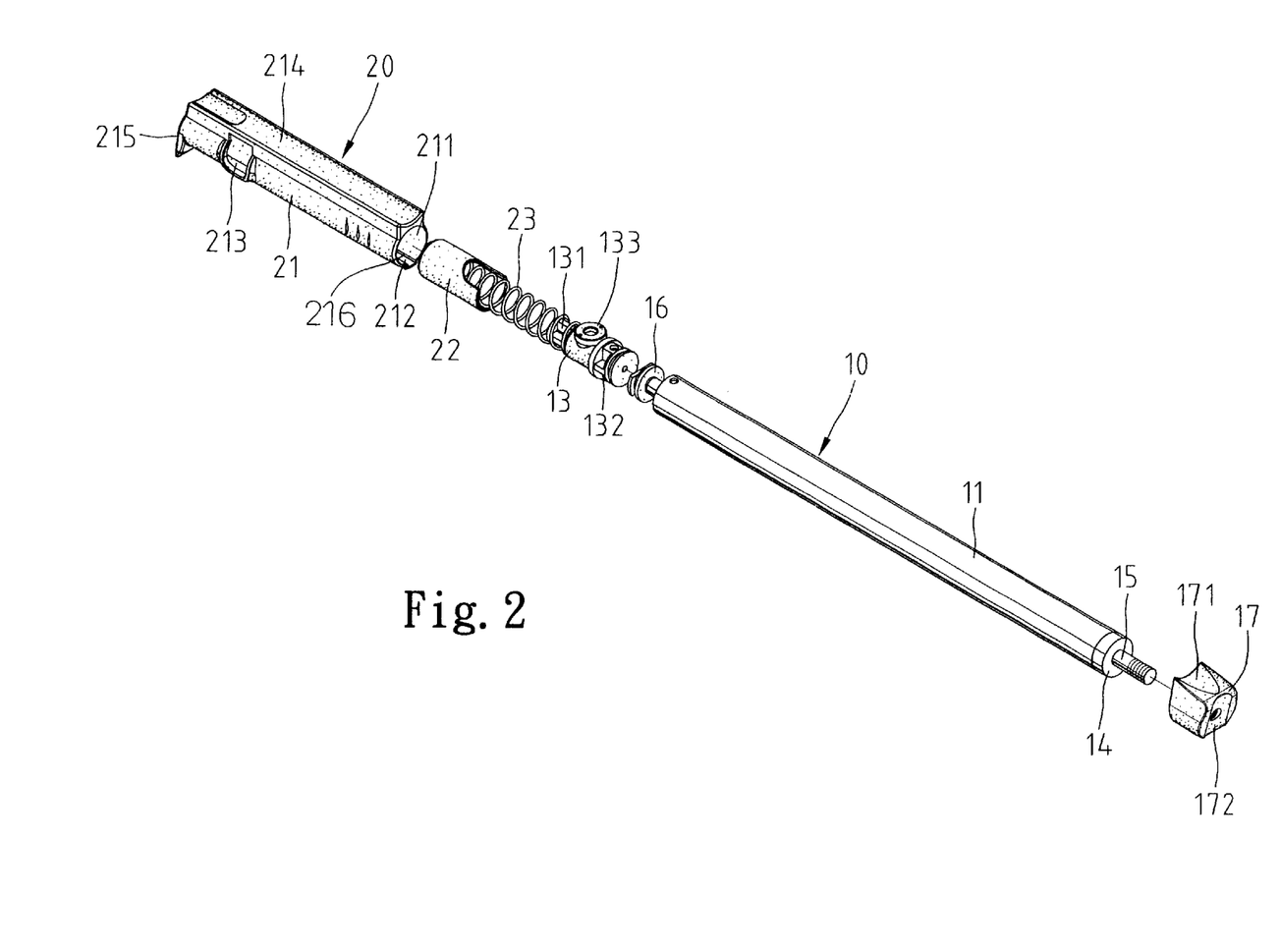
FIG. 2 is an exploded perspective view of the hand pump in accordance with the present invention.
Figure 3:
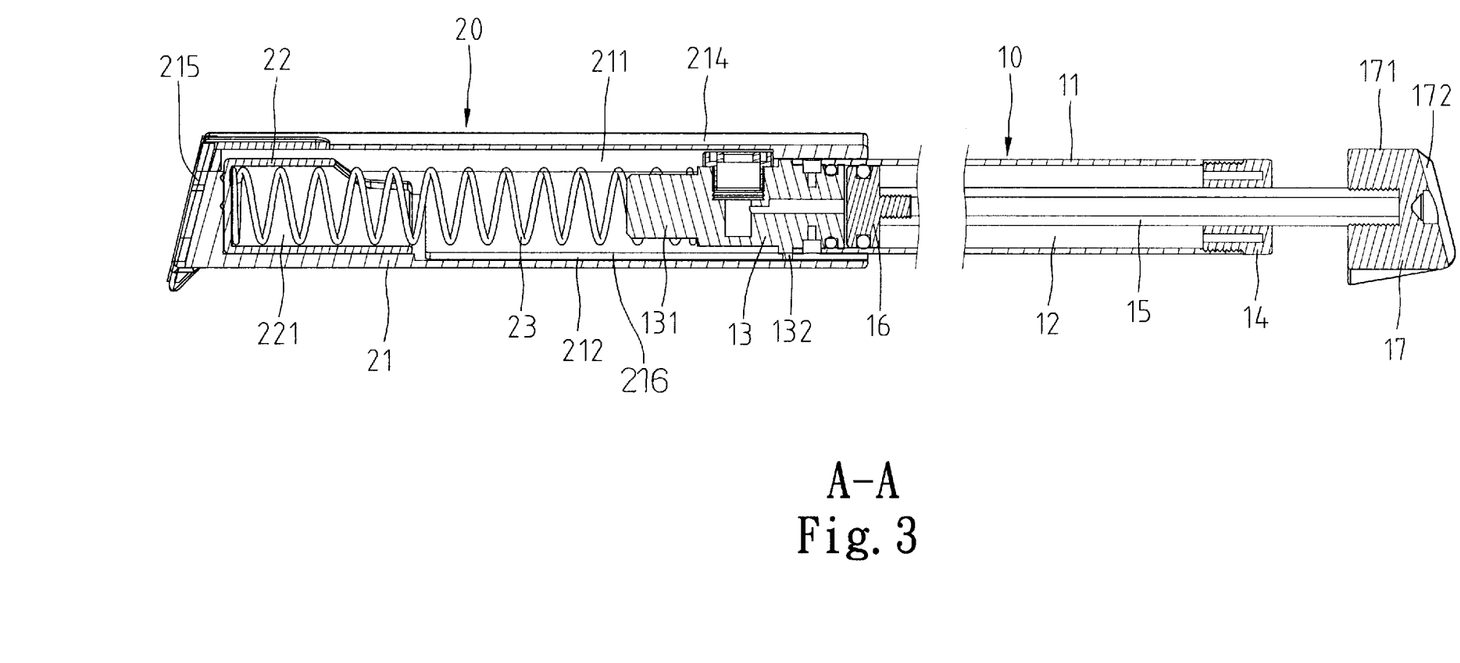
FIG. 3 is a sectional view taken along plane A—A in FIG. 1.
Figure 4:
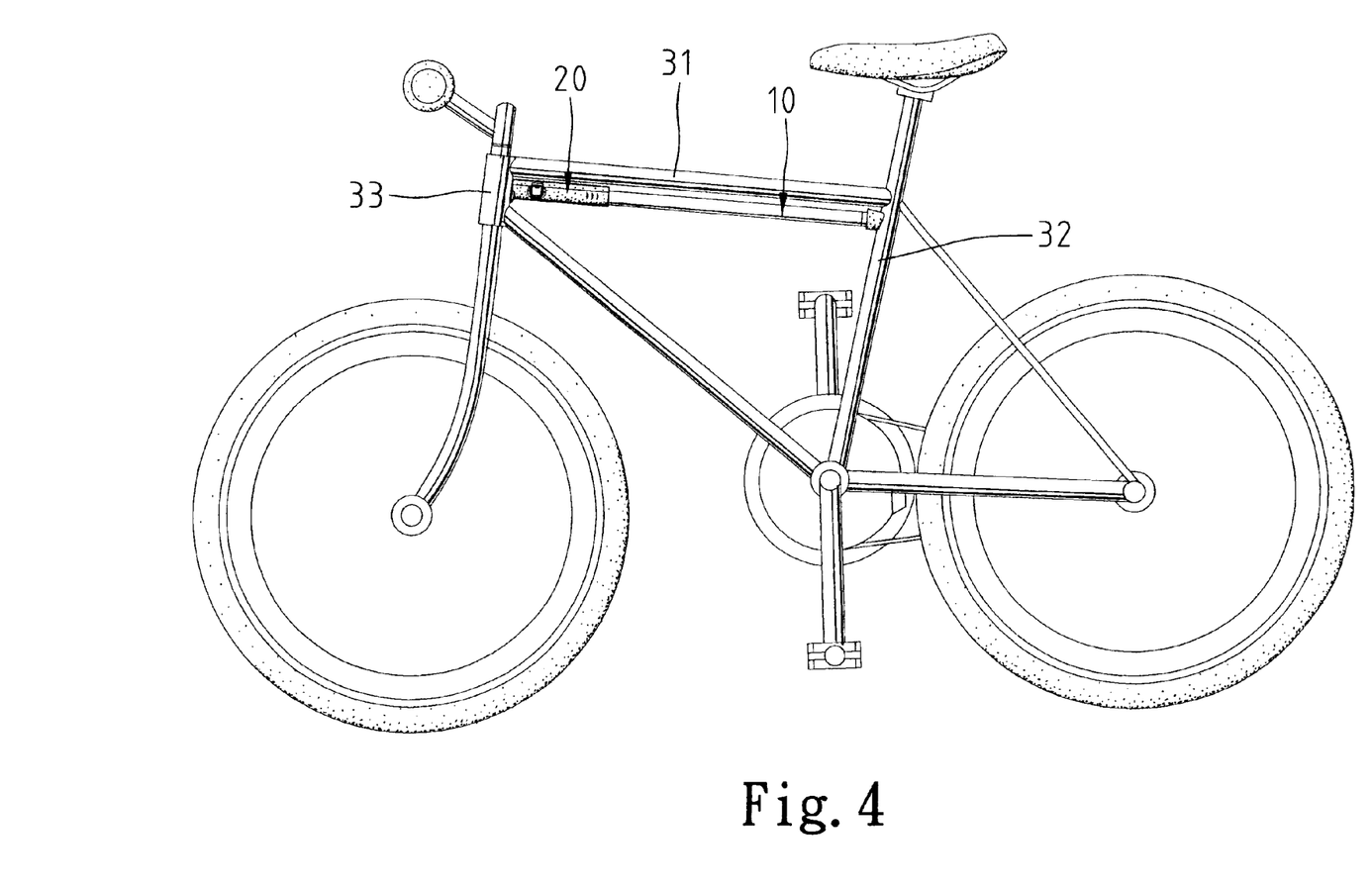
FIG. 4 is a schematic side view illustrating attachment of the hand pump to a bicycle frame.

Referring to FIGS. 1 through 3, a hand pump 10 in accordance with the present invention generally includes a cylinder 11 defining a chamber 12 therein. A head 13 is mounted to an end of the cylinder 11 includes an engaging portion 133 for engaging with a valve (not shown) of an object (not shown) to be inflated. Mounted to the other end of the cylinder 11 is an end cap 14 through which an end of a reciprocating member (such as a piston rod 15) extends. A handle 17 is attached to an outer end of the piston rod 15 that is outside the cylinder 11 for manual operation, and a piston 16 is attached to an inner end of the piston rod 15 that is reciprocatingly received in the chamber 12 of the cylinder 11. The handle 17 includes an end face with an arcuate recess 172 for attachment to a seat tube 32 (FIG. 4) of a bicycle (not labeled). The handle 17 further includes a side with an arcuate recess 171 for attachment to a top tube 31 of the bicycle. The head 13 further includes a stub 131 and a block 132 formed thereon.

An attaching device 20 is mounted to the head 13 and comprises an attachment member (such as a tube 21), a restrainer 22, and an elastic element 23. The tube 21 comprises a compartment 211, with an inner periphery defining the compartment 211 being so arranged to provide a longitudinal groove 216 extending along a direction parallel to a longitudinal direction of the cylinder 11 and a transverse groove 217 extending in a direction transverse to the longitudinal groove 216 and communicated with an end of the longitudinal groove 216. The tube 21 further includes an opening 213 that is aligned with the transverse groove 217. Namely, the transverse groove 217 of the tube 21 is communicated with the atmosphere via the opening 213. The longitudinal groove 216 and the transverse groove 217 together form a substantially L-shape guiding groove 212. The tube 21 further includes an arcuate recess 214 in an outer periphery thereof for attachment to the seat tube 32 (FIG. 4) of the bicycle. The tube 21 further includes an end face with an arcuate recess 215 for attachment to a head tube 33 (FIG. 4) of the bicycle. The restrainer 22 is received in an end of the compartment 211 of the tube 21 and includes a receptacle 221 for receiving an end of the elastic element 23. The other end of the elastic element 23 is securely attached to the stub 131 of the head 13 to move therewith.

Referring to FIG. 3, the head 13 of the cylinder 11 is accommodated in the other end of the compartment 211 of the tube 21 with the block 132 received in the L-shape guiding groove 212.

When attaching the hand pump 10 to a bicycle frame, the user grasps the tube 21 with one hand and grasps the cylinder 11 with the other hand and then moves the tube 21 and the cylinder 11 toward each other. A portion of the cylinder 11 is pushed into the tube 21. Next, referring to FIG. 4, the hand pump is attached to the bicycle frame with the arcuate recess 214 of the tube 21 and the arcuate recess 171 of the handle 17 engaging a lower periphery of the top tube 31 of the bicycle and with the arcuate recess 215 of the tube 21 engaging with an outer periphery of the head tube 33 of the bicycle. The handle 17 is adjacent to the seat tube 32, and the arcuate recess 172 of the handle 17 is moved to engage with an outer periphery of the seat tube 32 when the other hand of the user is removed from the cylinder 11. Thus, the hand pump 10 is easily, quickly, and securely attached to the bicycle frame. The elasticity of the elastic element 23 is sufficient to exert an outward force to the handle 17 and the outer end of the tube 21 to thereby securely attach the hand pump between the seat tube 32 and the head tube 33 of the bicycle.

Figure 5:
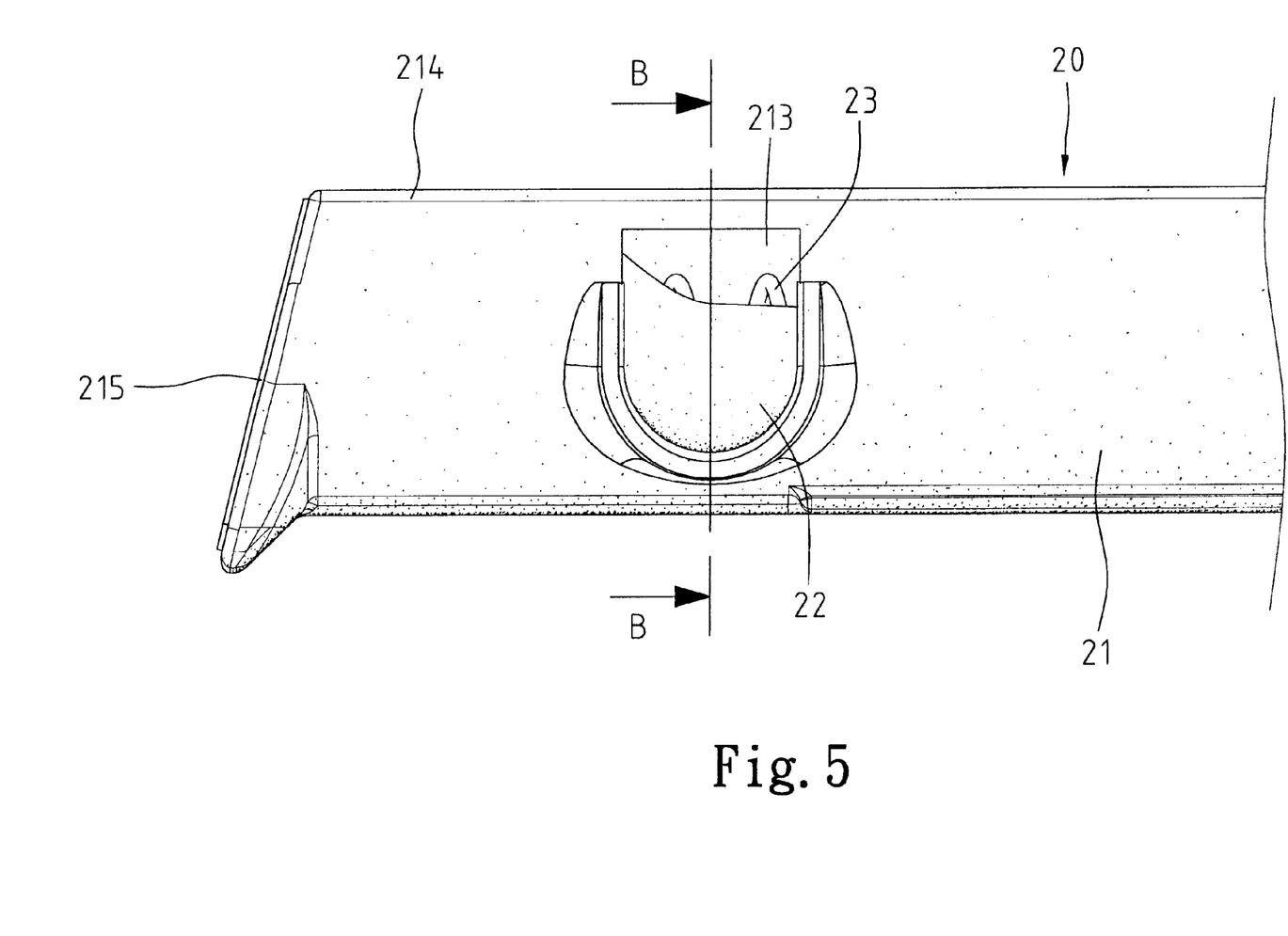
FIG. 5 is an enlarged view of an end of the hand pump in accordance with the present invention.
Figure 6:
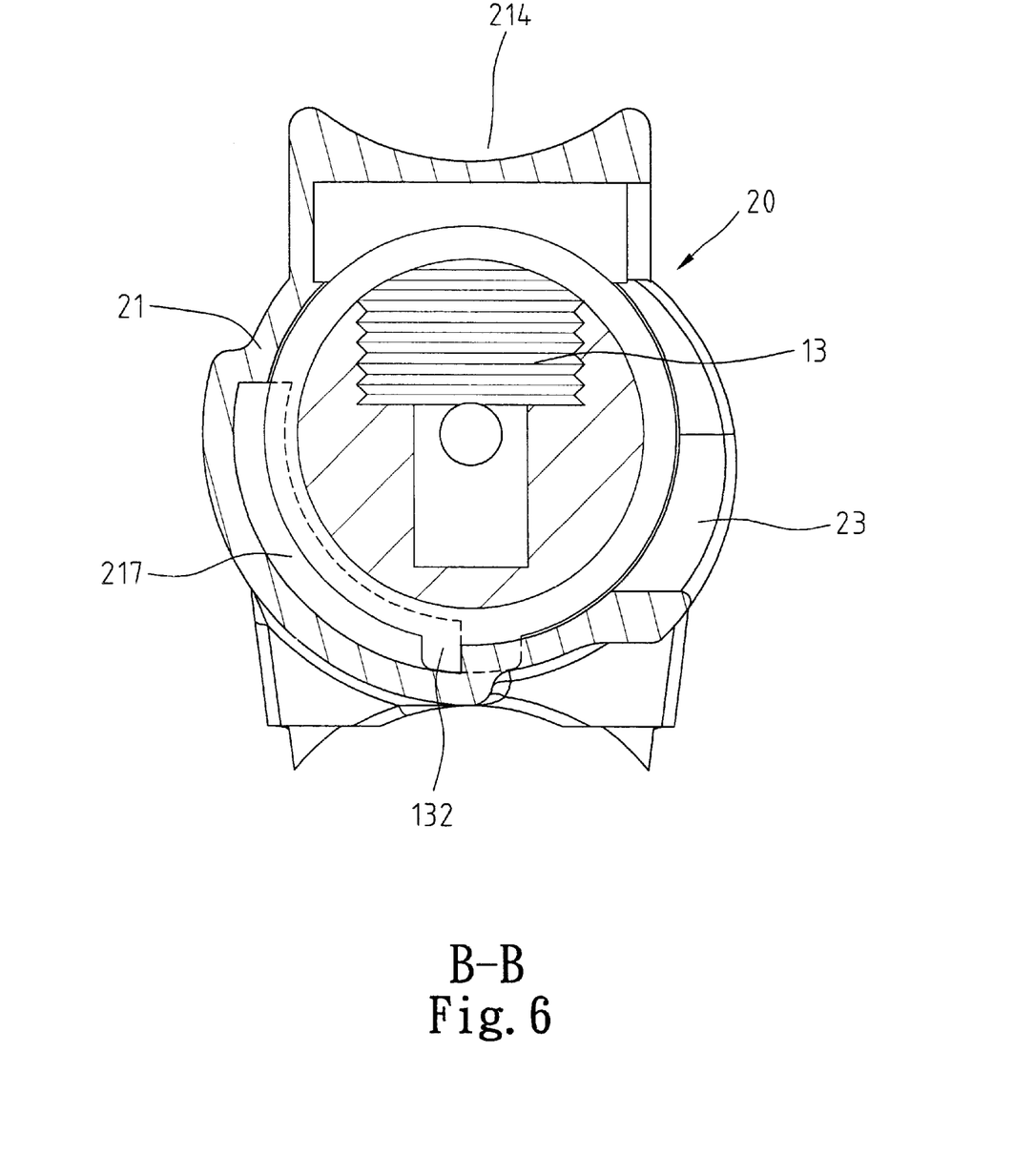
FIG. 6 is a sectional view taken along line B—B in FIG. 5.

Referring to FIGS. 5 and 6, when the hand pump 10 is attached to the bicycle frame, the block 132 of the head 13 is located in the longitudinal groove 216 and thus not exposed to the atmosphere. Namely, the head 13 is shielded by the tube 21 to avoid entrance of dust or other contaminants. This prolongs longevity of the hand pump 10.

Figure 7:
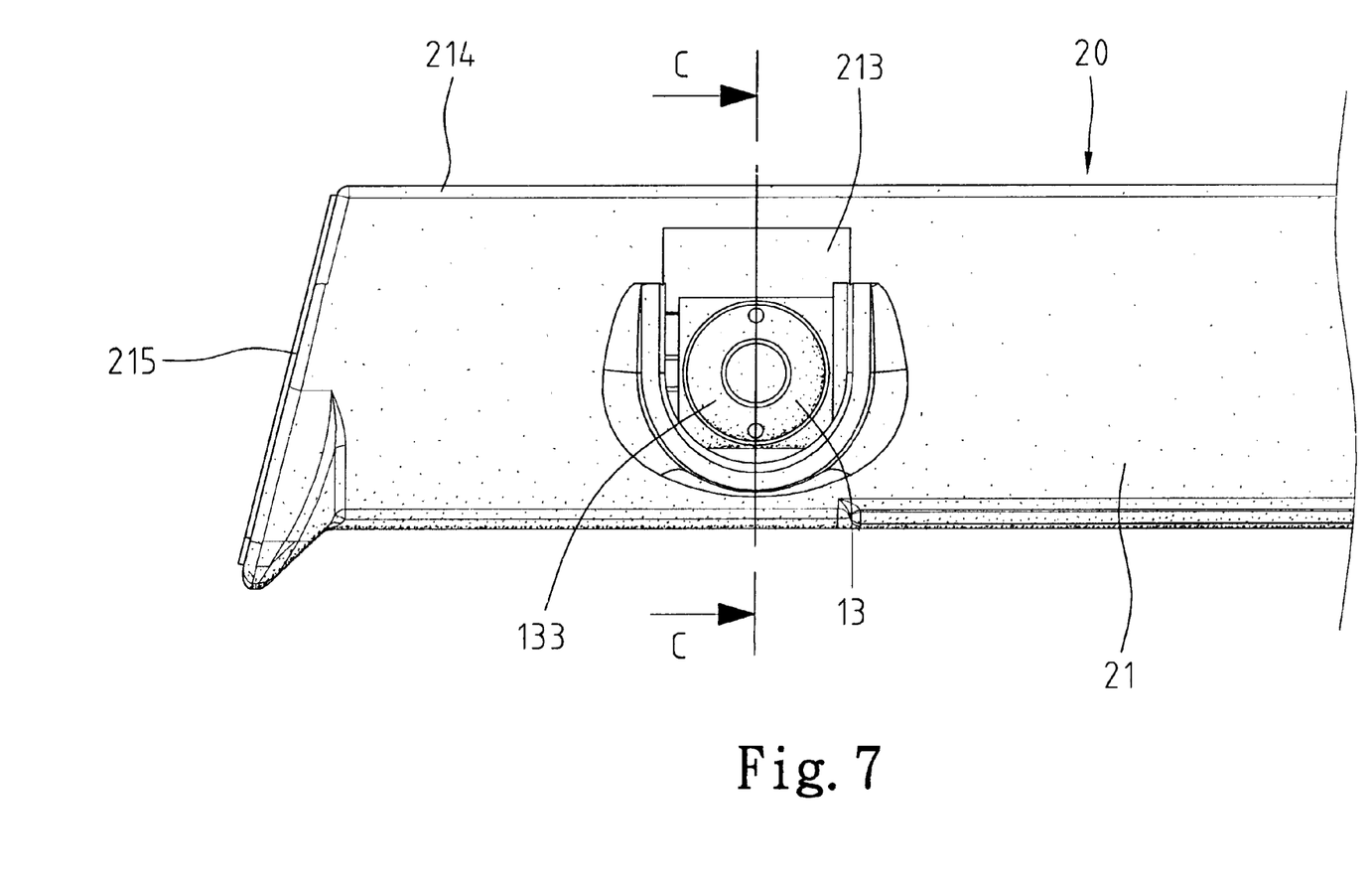
FIG. 7 is a sectional view similar to FIG. 5, wherein the hand pump is detached from the bicycle frame and in a state for inflation operation.
Figure 8:
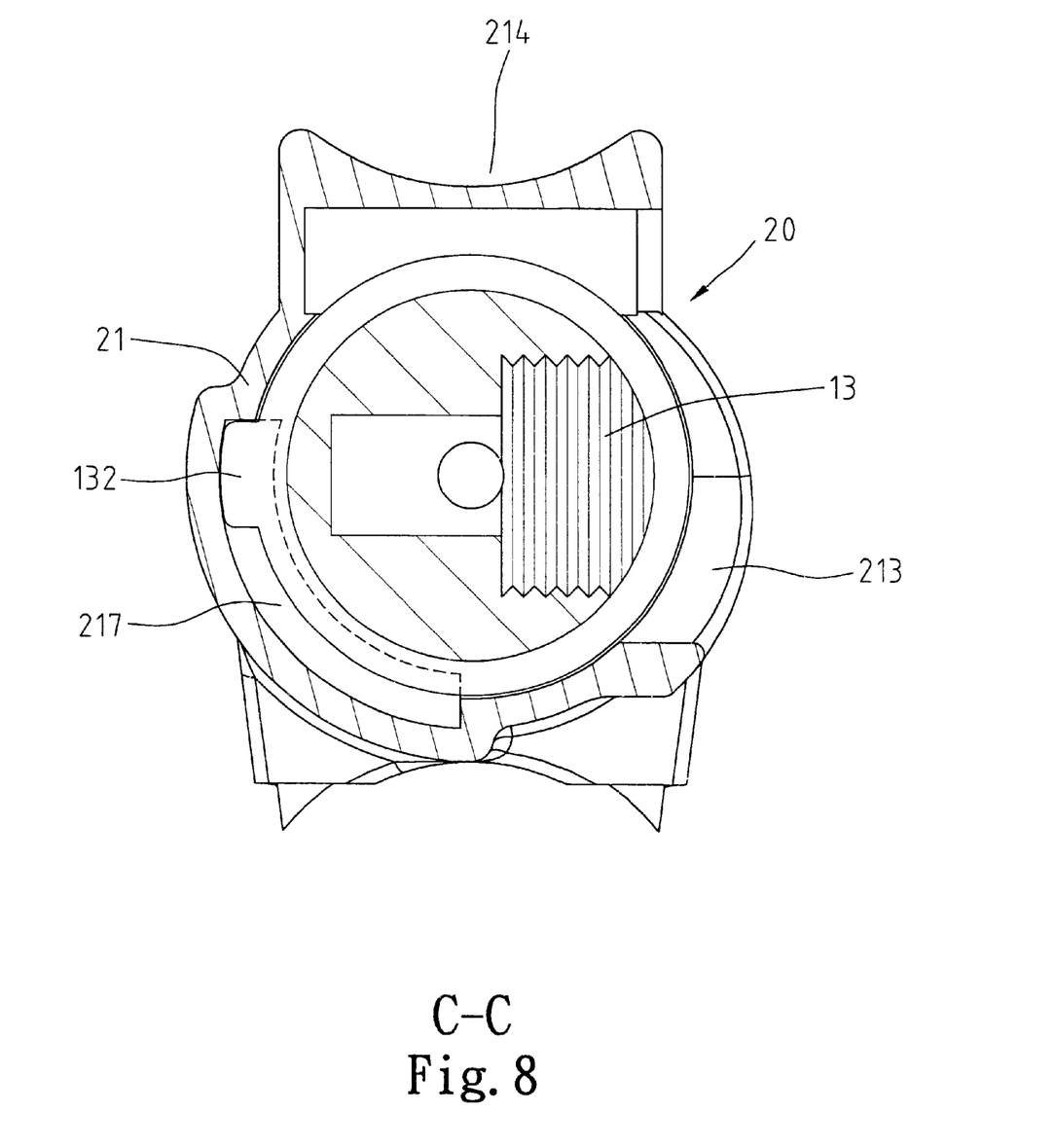
FIG. 8 is a sectional view taken along line C—C in FIG. 7.

In use, referring to FIGS. 7 and 8, the user grasps the tube 21 with one hand and grasps the cylinder 11 with the other hand and then moves the tube 21 and the cylinder 11 toward each other, thereby removing the hand pump 10 from the bicycle frame. The block 132 of the head 13 is moved to the end of the longitudinal groove 216 that communicates with the transverse groove 217. Then, the user turns the cylinder 11 through 90 degrees to move the block 132 of the head 13 into the transverse groove 217. The cylinder 11 is thus positioned relative to the tube 21 unless it is turned in a reverse direction which makes the block 132 move to the end of the longitudinal groove 216. The engaging portion 133 of the head 13 of the cylinder 11 is now in an operative position and communicates with the atmosphere via the opening 213 of the tube 21. The user may engage the engaging portion 133 of the head 13 with a valve of an object to be inflated, such as a bicycle tire.

Figure 9:
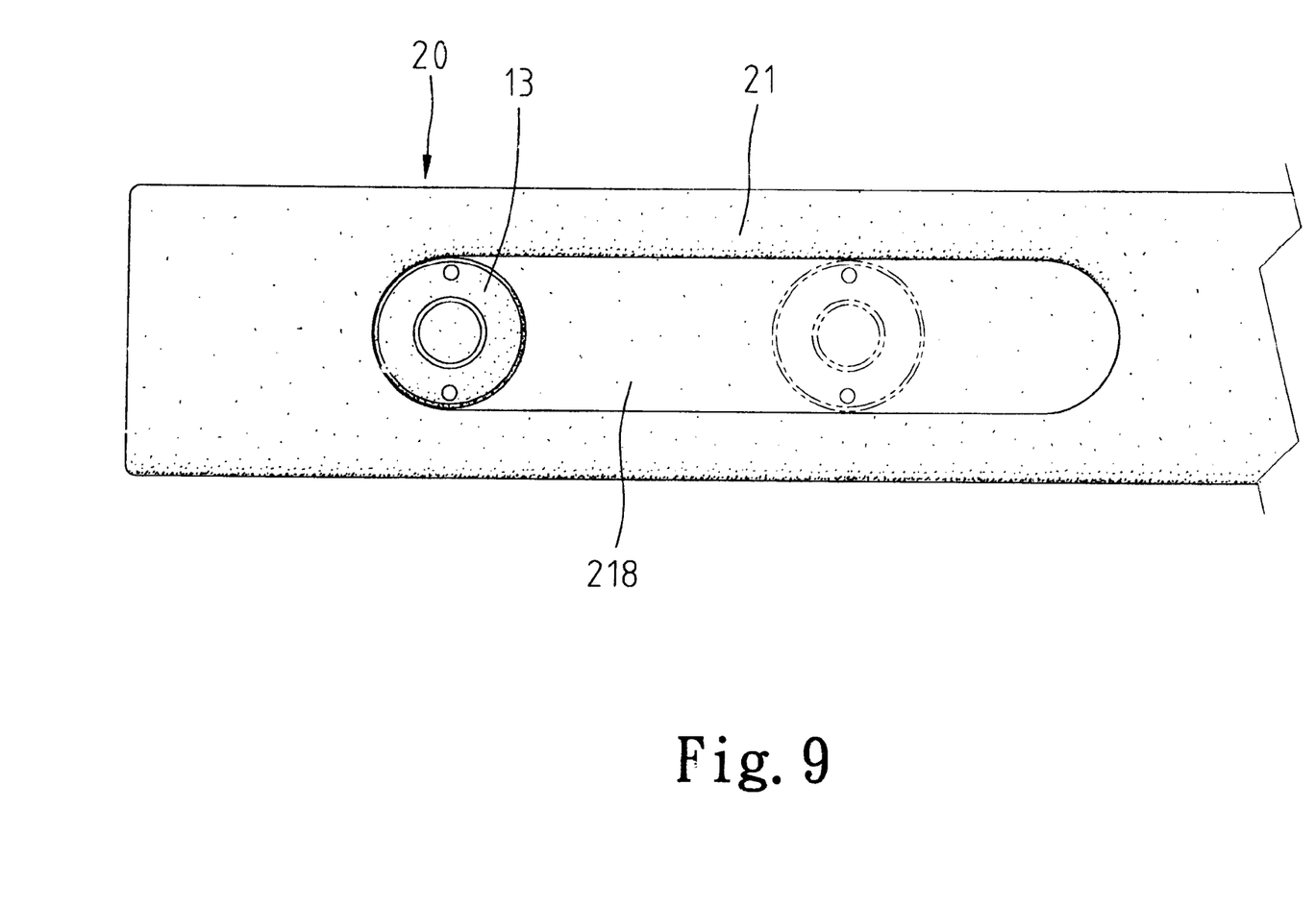
FIG. 9 is an enlarged schematic view illustrating a modified embodiment of an opening of a tube of the hand pump.

FIG. 9 illustrates a modified embodiment of the opening of the tube 21. In this embodiment, the opening is replaced by a longitudinal slot 218. When the block 132 of the head 13 slides along the longitudinal groove 216, the head 13 also slides in the longitudinal slot 218. Nevertheless, the head 13 of the cylinder 11 will be exposed to the atmosphere.

Figure 10:
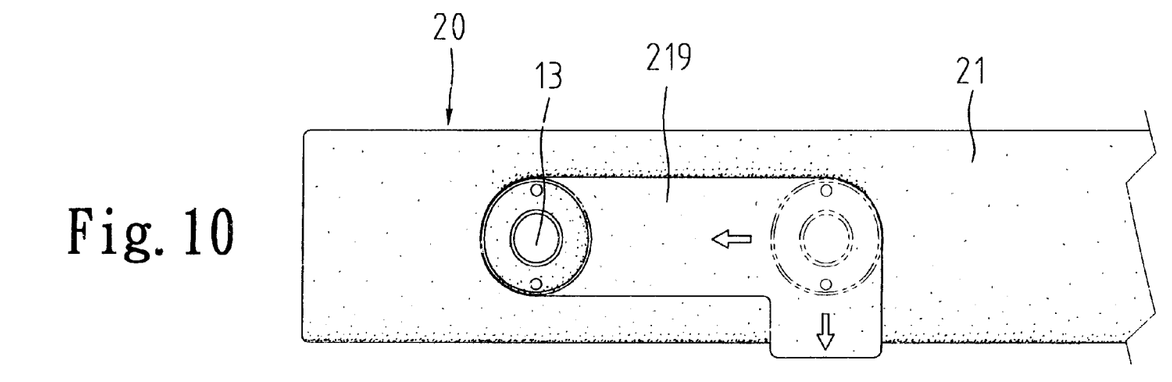
FIG. 10 is an enlarged view illustrating another modified embodiment of the opening of the tube of the hand pump.
Figure 11:
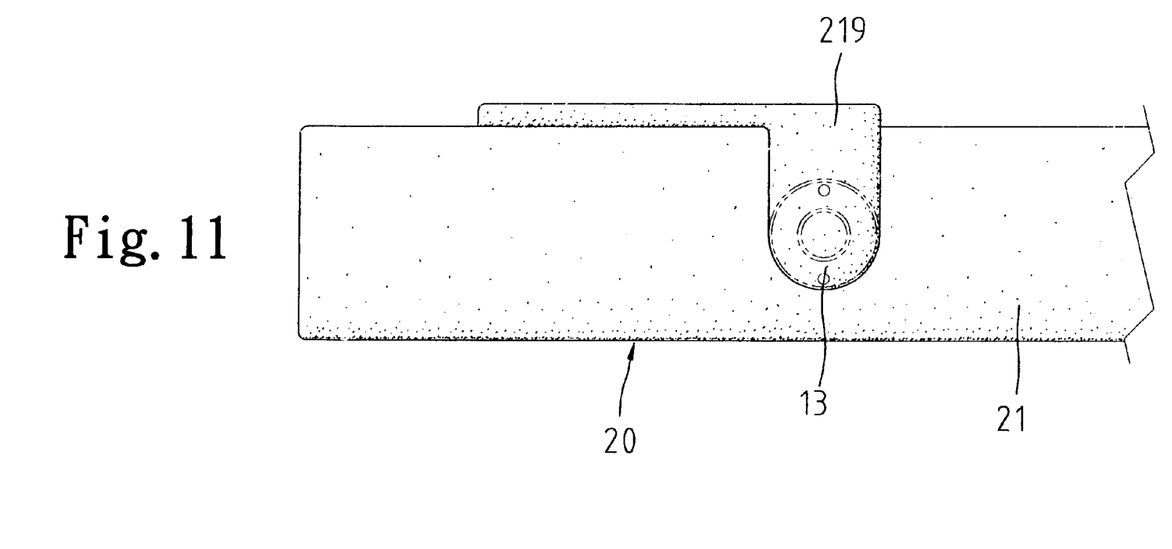
FIG. 11 is a view similar to FIG. 10, wherein the head of the hand pump is turned through 90 degrees.

FIG. 10 illustrates another modified embodiment of the opening of the tube 21. In this embodiment, the opening is replaced by a substantially L-shape slot 219. When the block 132 of the head 13 slides along the longitudinal groove 216, the head 13 also slides in the relatively longer portion of the L-shape slot 219. Referring to FIG. 11, when the cylinder 11 is turned through 90 degrees, the head 13 is moved into the transverse groove 217 and thus positioned in the relatively shorter portion of the L-shape slot 219 for inflating operation. Nevertheless, the head 13 of the cylinder 11 will be exposed to the atmosphere.

FIG. 10 illustrates another modified embodiment of the opening of the tube 21. In this embodiment, the opening is replaced by a substantially L-shape slot 219. When the block 132 of the head 13 slides along the longitudinal groove 216, the head 13 also slides in the relatively longer portion of the L-shape slot 219. Referring to FIG. 11, when the cylinder 11 is turned through 90 degrees, the head 13 is moved into the transverse groove 217 and thus positioned in the relatively shorter portion of the L-shape slot 219 for inflating operation. Nevertheless, the head 13 of the cylinder 11 will be exposed to atmosphere.

Although the invention has been explained in relation to its preferred embodiment, it is to be understood that many other possible modifications and variations can be made without departing from the scope of the invention as hereinafter claimed.

What is claimed is:

1. A hand pump comprising:

a cylinder defining a chamber therein and including a first end and a second end;

a reciprocating member having a first end slidably received in the chamber of the cylinder and a second end extended beyond the first end of the cylinder;

a head mounted to the second end of the cylinder and including an engaging portion adapted to engage with a valve of an object to be inflated;

a handle attached to the second end of the reciprocating member rod and including a first arcuate recess for engaging with a seat tube of a bicycle; and an attachment member mounted to the head and including a second arcuate recess for engaging with a head tube of the bicycle;

the attachment member and the head being movable relative to each other along a longitudinal direction of the cylinder.

2. The hand pump as claimed in claim 1, wherein the handle further comprises a third arcuate recess for engaging with a top tube of the bicycle.

3. The hand pump as claimed in claim 2, wherein the handle further comprises a fourth arcuate recess for engaging with the top tube of the bicycle.

4. The hand pump as claimed in claim 1, wherein the attachment member comprises another arcuate recess for engaging with a top tube of the bicycle.

5. The hand pump as claimed in claim 1, wherein the attachment member is a tube comprising a compartment for receiving the head, further comprising an elastic element between the head and an end face defining the compartment of the tube.

6. The hand pump as claimed in claim 1, wherein the attachment member is a tube comprising a compartment for receiving the head, the tube further comprising an opening, an inner periphery defining the compartment of the tube comprising a longitudinal groove that extends along a direction parallel to the longitudinal direction of the cylinder and a transverse groove that extends in a direction transverse to the longitudinal groove and that is communicated with an end of the longitudinal groove, the transverse groove being communicated with atmosphere via the opening of the tube, the head comprising a block that is slidably received in the longitudinal groove and the transverse groove;

wherein the head is not exposed to the atmosphere when the hand pump is attached between the seat tube and the head tube of the bicycle.

7. The hand pump as claimed in claim 6, wherein the head is movable into the transverse groove and thus positioned in place with the engaging portion communicating with the atmosphere via the opening when the hand pump is removed from the bicycle for inflation.

8. The hand pump as claimed in claim 7, further comprising a retainer received in an end of the tube that is distal to the head, an elastic element comprising a first end securely received in the retainer and a second end securely attached to the head to move therewith.

9. The hand pump as claimed in claim 8, wherein the head includes a stub to which the second end of the elastic element is securely attached.

10. The hand pump as claimed in claim 1, wherein the attachment member is a tube comprising a compartment for receiving the head, an inner periphery defining the compartment of the tube comprising a longitudinal groove that extends along a direction parallel to the longitudinal direction of the cylinder, the head comprising a block that is slidably received in the longitudinal groove, further comprising an elastic element having a first end attached to an end face defining the compartment and a second end securely attached to the head to move therewith.

11. The hand pump as claimed in claim 10, wherein the tube further comprises an opening, the inner periphery defining the compartment of the tube further comprising a transverse groove that extends in a direction transverse to the longitudinal groove and that is communicated with an end of the longitudinal groove, the transverse groove being communicated with atmosphere via the opening of the tube, the block of the head being slidably received in the longitudinal groove and the transverse groove;

wherein the head is not exposed to the atmosphere when the hand pump is attached between the seat tube and the head tube of the bicycle.

12. The hand pump as claimed in claim 11, wherein the head is movable into the transverse groove and thus positioned in place with the engaging portion communicated with the atmosphere via the opening when the hand pump is removed from the bicycle for inflation.

13. The hand pump as claimed in claim 12, further comprising a retainer received in an end of the tube that is distal to the head, the first end of the elastic element is securely received in the retainer.

14. The hand pump as claimed in claim 13, wherein the head includes a stub to which the second end of the elastic element is securely attached.

15. The hand pump as claimed in claim 13, wherein the tube further comprises another arcuate recess for engaging with a top tube of the bicycle.

16. The hand pump as claimed in claim 15, wherein the handle further comprises a further arcuate recess for engaging with the top tube of the bicycle.

17. The hand pump as claimed in claim 10, wherein the tube further comprises a longitudinal slot along which the head slides.

18. The hand pump as claimed in claim 10, wherein the tube further comprises an L-shape slot including a relatively longer portion and a relatively shorter portion, the inner periphery defining the compartment of the tube further comprising a transverse groove that extends in a direction transverse to the longitudinal groove and that is communicated with an end of the longitudinal groove, the head being slidable along the relatively longer portion of the L-shape slot of the tube while the block of the head is slidable along the longitudinal groove, the head being positioned in the relatively shorter portion of the L-shape slot of the tube while the block of the head is positioned in the transverse groove.

19. The hand pump as claimed in claim 18, wherein the handle further comprises a third arcuate recess for engaging with the top tube of the bicycle.

20. The hand pump as claimed in claim 10, wherein the handle further comprises a third arcuate recess for engaging with a top tube of the bicycle.

* * * * *